United States Patent
Striegel et al.

(10) Patent No.: US 11,697,236 B2
(45) Date of Patent: Jul. 11, 2023

(54) HOT RUNNER PROCESS CONTROLLER

(71) Applicant: Incoe Corporation, Auburn Hills, MI (US)

(72) Inventors: Christian Striegel, Hainburg (DE); Anton Joerg, Grossostheim (DE); Scott Greb, Washington Township, MI (US); Thomas Braun, Hof (DE)

(73) Assignee: Incoe Corporation, Auburn Hills, MI (US)

( * ) Notice: Subject to any disclaimer, the term of this patent is extended or adjusted under 35 U.S.C. 154(b) by 0 days.

(21) Appl. No.: 17/204,597

(22) Filed: Mar. 17, 2021

(65) Prior Publication Data

US 2022/0193970 A1    Jun. 23, 2022

(51) Int. Cl.
  *B29C 45/84*   (2006.01)
  *B29C 45/27*   (2006.01)
  (Continued)

(52) U.S. Cl.
  CPC .......... *B29C 45/84* (2013.01); *B29C 45/2737* (2013.01); *B29C 45/281* (2013.01);
  (Continued)

(58) Field of Classification Search
  CPC ... B29C 45/2737; B29C 45/281; B29C 45/77; B29C 45/78; B29C 2045/7606;
  (Continued)

(56) References Cited

U.S. PATENT DOCUMENTS

| 6,884,061 B2 * | 4/2005 | Okamura | B29C 45/2806 425/557 |
| 2004/0043092 A1 * | 3/2004 | Dachs | B29C 45/76 425/162 |

(Continued)

FOREIGN PATENT DOCUMENTS

| CN | 111571951 | 8/2020 |
| JP | 61064419 | 4/1986 |

(Continued)

OTHER PUBLICATIONS

International Search Report and Written Opinion, dated Apr. 21, 2022, 10 pages.

(Continued)

*Primary Examiner* — Matthew J Daniels
*Assistant Examiner* — Gregory C. Grosso
(74) *Attorney, Agent, or Firm* — Gunther Evanina; Butzel Long

(57) ABSTRACT

A hot runner process controller configured to monitor the status and operation of a hot runner system to autonomously generate information to improve the quality of injection molding process of a hot runner system having an inlet nozzle, one or more manifolds and one or more nozzles with actuator or without actuator, and one or more heating elements, the hot runner process controller is self-operating, and independent from the injection molding machine, includes: one or more sensors located on, in or at the hot runner system to detect the status and/or the operation of the hot runner system, and a processing unit and a memory. The (Continued)

processing unit is connected to the one or more sensors, wherein the memory stores data and program codes. The processing unit is configured to load and execute the program code to compare sensor information with the stored data and to determine if the hot runner system is in an operable status, and in case the hot runner system is in an operable status, configured to generate status information to activate the one or more heating elements and/or the one or more actuators enabling a production operation of the injection molding machine. In case the hot runner system is not in an operable status, configured to generate status information to deactivate the one or more heating elements and/or close or deactivate the one or more actuators disabling a production operation of the injection molding machine.

9 Claims, 12 Drawing Sheets

(51) Int. Cl.
*B29C 45/28* (2006.01)
*B29C 45/77* (2006.01)
*B29C 45/78* (2006.01)
*B29C 45/76* (2006.01)

(52) U.S. Cl.
CPC .............. *B29C 45/77* (2013.01); *B29C 45/78* (2013.01); *B29C 2045/7606* (2013.01); *B29C 2945/7604* (2013.01); *B29C 2945/76006* (2013.01); *B29C 2945/7614* (2013.01); *B29C 2945/7628* (2013.01); *B29C 2945/76056* (2013.01); *B29C 2945/76163* (2013.01); *B29C 2945/76277* (2013.01); *B29C 2945/76471* (2013.01)

(58) Field of Classification Search
CPC .. B29C 2945/76006; B29C 2945/7604; B29C 2945/76056; B29C 2945/7614; B29C 2945/76163; B29C 2945/76277; B29C 2945/7628; B29C 2945/76471; B29C 45/84
USPC .......................................... 264/40.1; 700/200
See application file for complete search history.

(56) References Cited

U.S. PATENT DOCUMENTS

| | | | |
|---|---|---|---|
| 2005/0256612 A1* | 11/2005 | Linehan | G05D 23/1932 700/277 |
| 2014/0037779 A1 | 2/2014 | Olaru | |
| 2015/0151473 A1 | 6/2015 | Olaru | |
| 2019/0018579 A1 | 1/2019 | Moss | |
| 2021/0046685 A1* | 2/2021 | Kennedy | B29C 45/84 |

FOREIGN PATENT DOCUMENTS

| | | | | |
|---|---|---|---|---|
| JP | 61217217 | | 9/1986 | |
| WO | WO 2007/143812 | | 12/2007 | |
| WO | WO 2013/075232 | | 5/2013 | |
| WO | WO-2019167033 A1 * | | 9/2019 | ......... B29C 45/2725 |
| WO | WO2020049431 A1 | | 3/2020 | |

OTHER PUBLICATIONS

European Search Report, dated May 28, 2021, 25 pages.
MCS Hot Runner Controller—Precise and Convenient Process Control—Feller Engineering GmbH, dated Feb. 17, 2020, 12 pages.

* cited by examiner

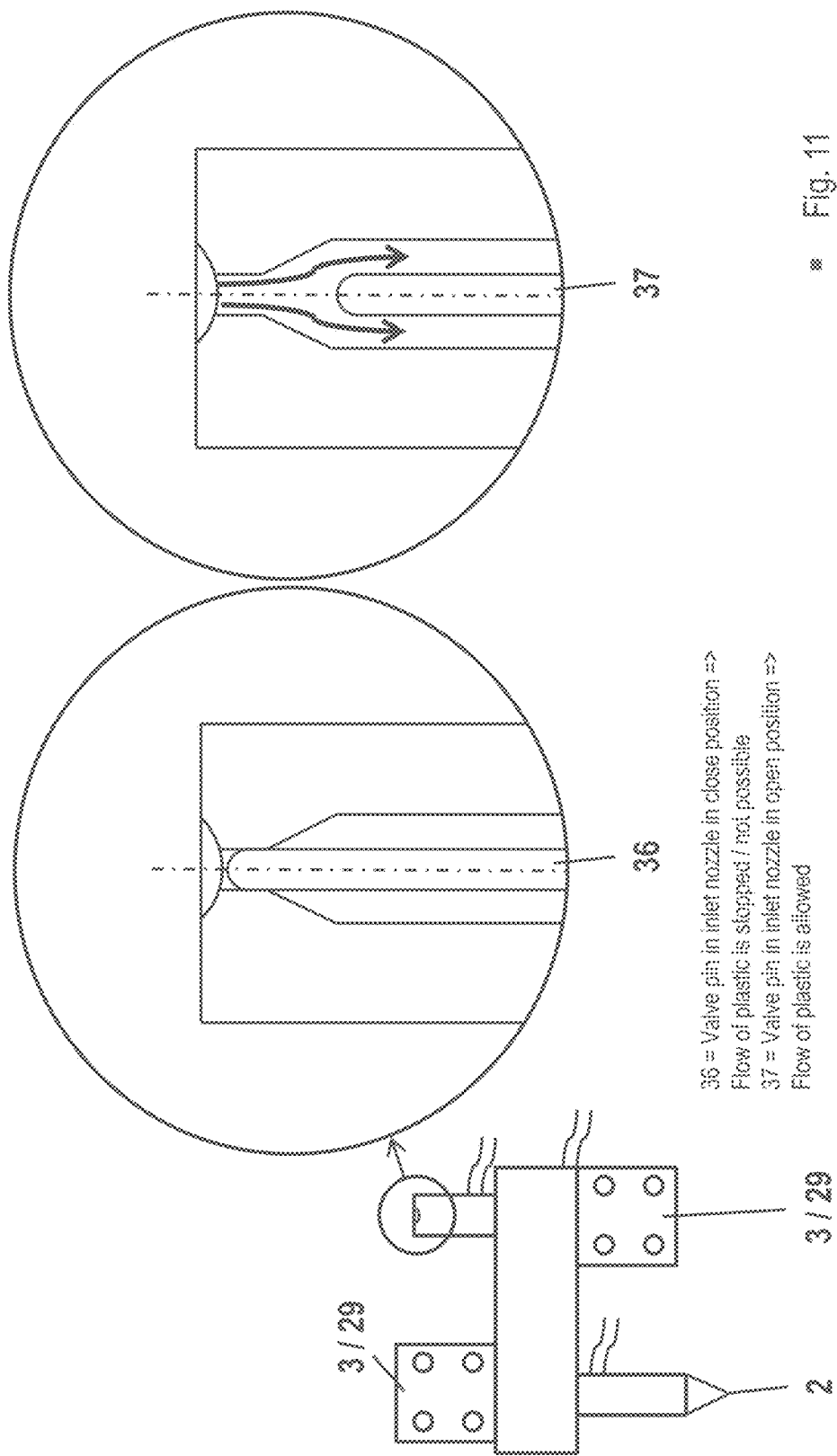

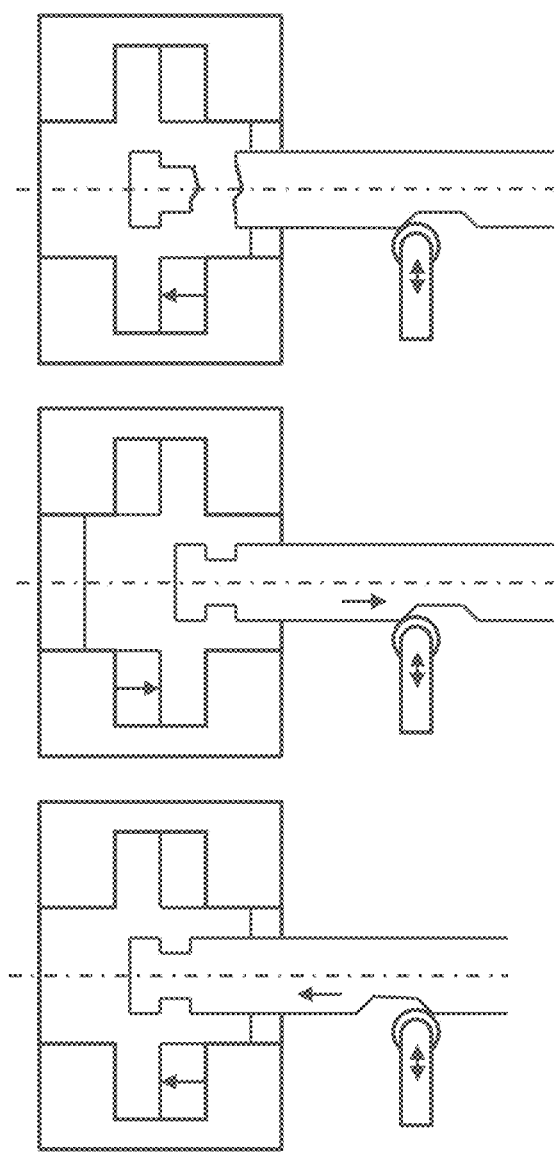

HOT RUNNER PROCESS CONTROLLER

CROSS-REFERENCE TO RELATED APPLICATIONS

This application claims priority to European Patent Application No. EP 20215358.1, filed on Dec. 18, 2020 which is incorporated herein by reference in its entirety.

FIELD OF THE DISCLOSURE

The invention pertains to a hot runner process controller configured to monitor the status and operation of a hot runner system.

BACKGROUND OF THE DISCLOSURE

Typically, injection molding machines are connected to hot runner systems which are again in connection with a mold. The molten plastic is pressed from the injection molding system via the hot runner systems into the mold. In general, the hot runner system, the injection molding machine and the molds are manufactured by different manufacturers. Based on predefined interfaces, these components work together in the injection molding process. However, the injection molding machine does not control and/or monitor the hot runner system sufficiently to avoid errors or the production of products with low quality. The injection molding machine might control the heating elements and the actuators based on preprogrammed information, but this control is not sufficient to detect a sub optimal injection molding process or application errors. In the application, the injection molding machine can have an integrated or an external hot runner temperature controller as well as an internal or external hydraulic or pneumatic controller such as a cascade control, which belong according to the definition in this application to the injection molding machine.

For example, during the pre-heating of the mold and the hot runner system in a pre-heating station there is no physical connection between the injection molding machine and the other components. In this case no control can be executed by the injection molding machine only by the pre-heating station and its periphery.

The hot runner system comprises one or more manifolds having one inlet nozzle connected to the injection molding machine, and one or more nozzles connected to the several manifolds in the hot runner system that comprise an inlet nozzle, one or more manifolds and one or more nozzles without actuator or with actuator, and heating elements.

It would therefore be highly desirable to provide means and a method to monitor the hot runner system and to detect errors or any loss in quality of the plastic products molded and have the possibility to intervene before damage or quality loss occurs. It is an objective to save the hot runner system, the mold, and plastic melt from damage. Furthermore, it is an objective to reduce scrap parts after a start of the melting process. Also, it is an objective to reduce the cleaning action for the molder, mold maker (and their service teams) and save intense cost for service and repair. A further objective is to improve the mechanical stability for molded parts and to improve the surface of molded parts. Another objective is that corrosive wear or a too high pressure can be detected before any damage, injury, fire or explosion could happen. Also, an objective is to provide preventive maintenance triggering so that maintenance costs are reduced. Which again leads to a reduction of down time for the injection molding machine and increases availability.

SUMMARY OF THE DISCLOSURE

The invention provides a hot runner process controller to autonomously generate information to improve the quality of injection molding process being independent from the molding machine. Independent in this context means, the power supply, the processing unit run independent from the injection molding machine, so that an operation can be performed even if the injection molding machine is not operated or connected. The hot runner process controller can be focused and optimized to monitor and control the hot runner system. In a possible embodiment, the hot runner process controller comprises a separate housing, which can be attached to the hot runner system, so that the units can be transported together for the pre-heating process.

The hot runner process controller can be configured to monitor the status and operation of the hot runner system. The hot runner system comprises an inlet nozzle, one or more manifolds and one or more nozzles without actuator or with actuator, and heating elements.

The hot runner process controller is self-operating, and independent from the injection molding machine.

In one aspect of this disclosure, the hot runner process controller includes a connection to one or more sensors located on, in, or at the hot runner system to detect the status and/or the operation of the hot runner system. The sensors can be of a different kind.

A memory stores and exchanges information with the processing unit. The processing unit can be a central processing unit. The processing unit is connected to the one or more sensors. The connection can be direct or by use of analog/digital converters, or analog or digital interfaces or input/output ports. The memory stores data and program code, which is loaded and executed by the processing unit. During execution of the program code, the sensor information is compared with the stored data to determine if the hot runner system is in an operable status, and in case the hot runner system is in an operable status, the processing unit generates status information to activate the heating elements and/or to activate or open the actuator to operate. In case the hot runner system is in a non-operable status, the processing unit generates status information to deactivate the heating elements and/or close or deactivate the actuators. The status information can be provided to an interface (input and/or output) to directly or indirectly activate or deactivate the operation of the hot runner system.

The process controller determines whether normal control of the injection-molding system during operation is granted or interrupted. In case all parameters are normal the operation is granted, in case information to deactivate are generated, the controller overrules the operation and process of the injection-molding apparatus to avoid damage.

In some embodiments, the nozzles can be opened and closed by an actuator which in general is controlled by the injection molding system. The hot runner process controller has a direct or indirect access to the actuators to overrule the operation of the injection molding system. The direct access is provided by switches, relays or valves which are directly connected to the processing unit. The indirect control can be performed via a communication interface of the injection molding system.

In a possible embodiment, the deactivation/activation is performed by triggering separate switches and valves to open/close, so that the operation of the hot runner system is activated or disabled. These switches and/or valves located in connections/lines between the injection molding machine and the hot runner system allowing to interrupt the operation of the injection molding machine. These switches and/or valves are operated over interfaces by the processing unit on the basis of the status information generated using the sensors, to activate or deactivate the control of the hot runner system by the injection molding machine.

In a possible embodiment, the hot runner process controller comprises a switching unit spatial grouping the switches and/or valves and providing connectors identical to the connectors of standard hot runner systems, wherein the switching unit is placed in between cables and connectors so that the injection molding machine can be connected to the switching unit without amendments of the connectors. This allows a seamless integration of the invention into existing injection molding machines since none of the connectors (plugs/sockets) have to be changed. It is also possible that the switching unit comprise separate cables with sockets that connect to the plugs of a standard hot runner system.

In a possible embodiment, the hot runner process controller comprises a signal line output which is connectable to the injection molding machine to provide the status information, to indicate the operations status of the hot runner system so that the injection molding machine can be controlled by the status information and might overrule the operation of the injection molding machine. This signal line can be any network or a single/multiple status line. The status can be an information packet including several byte or k-byte of information or a binary information.

In a possible embodiment, the hot runner process controller comprises one or more of the following sensors: a temperature sensor to detect a temperature of one or more components of the hot runner system or cutouts within the components of the hot runner system, or areas of the manifold or within a flow channel. The components can be the nozzle, the actuator or parts of the actuator, the manifold or areas of the manifold which are defined by a heating element.

Cutouts are defined within the hot runner system especially in the vicinity of the manifold or elements surrounding the manifold, in these cutouts a leak can be determined. A humidity sensor detects humidity surrounding the hot runner system which is an indication of a cooling leak.

A flow sensor to detect flow of fluids or melt, the flow sensors can be mechanically pressure driven or ultra-sonic sensors to determine if the cooling fluid, the pressure fluid of the actuator, or the melt is moving within the correct limits or a pressure sensor to detect pressure in fluids or melt. Based on the pressure information, the status/cycle, time/cycle number of the injection molding process can be determined and also a leak or too high pressure above a predefined value can be determined indicating an error. Leak sensors detect a leak in areas with possible leakage, for example, fluid lines and/or the inlet nozzle and/or in the manifold the hot runner nozzles and/or actuators, and/or the joints to each other. The leak sensor can be a mechanical sensor, a temperature sensor or a pressure sensor. The temperature sensor can detect a higher temperature in areas of the manifold indicating a plastic leak since the hot plastic is in contact with the temperature sensor or detect a temperature drop if the leaking plastic insulates the temperature sensor. Also, a mechanical sensor can be moved or bent/broken by plastic leaking out. The areas with possible leakage can be fluid lines, pipes, hoses for oil, water and/or air or joints, inlet nozzle to the manifold, nozzle to manifold, manifold to manifold, end cap to shank, or sleeve seal to manifold and a bending sensor attached to the hot runner system to detect deformation. The bending sensor can be metal that changes its electrical properties when bending or a strain gage indicates an unnormal state if bending is too strong (ware detection because parts can break), or the status within the cycle (cycle counter or cycle time detection), when the mold is closed or open, which leads to different bending states or a vibration sensor to detect a movement of the hot runner system to be able to detect a status within a cycle. In case the molt is opened or closed, different vibrations are generated and an acoustic sensor detect a sound of an operations with respect to the hot runner system. The acoustic sensor can be a microphone which records the sounds of the environment, and based on certain pre-stored sound pattern, the condition, the status, or the cycle of the operation can be determined; also ware can this way be detected (e.g. the sound will change when a valve pin is fretting); a gyro-sensor to detect movement of the hot runner system. Also, this sensor allows to determine a relocation and/or the movement of the hot runner system; and a potentiometer on hydraulic, pneumatic or electrical actuator to detect a movement within the nozzle to determine a location of a nozzle pin and/or the cycle time. In case of an actuator that drives a nozzle pin to open and close the nozzle, the position and the condition should be determined. In case the nozzle pin is broken, the position of the pin diverges from the position determined by the potentiometer; and a limit switch on hydraulic, pneumatic or electrical actuators to determine a location of a needle of the hot runner nozzle and/or the cycle time. The limit switch is also used as the potentiometer in combination with an actuator; however, the information is binary; an optical sensor mounted on a mold or the hot runner system to detect light via a bore in the mold to a parting line if the mold is open or closed; sensors for wear detection to detect if a wall or other components of the manifold are washed out or if the heating element reaches the end-of-life time or if a nozzle pin is broken. These sensors can also be temperature sensors with a defined metal shield. In case the temperature sensor is not working because of a washed-out metal, shield conditions of the manifold can be derived.

In a possible embodiment, the processing unit performs one or more of the following operations on the basis of the sensor information:

detecting by a flow sensor and a temperature sensor if a cooling and/or actuating fluid in the one or more actuators of the hot runner system is running at a minimum flow rate and below a maximum temperature measured preferably at an outlet of the cooling and/or actuating fluid; generating the status information to indicate that the one or more heating elements of the hot runner system can be activated to heat up. In this case, an overheating of the actuator can be avoided and information to turn on the heating element or open the valves can be generated. If the temperature of the cooling fluid is getting too high, the heating element can be interrupted/power reduced or information can be generated to power down/shutoff the heating element;

detecting by a temperature sensor that a cooling and/or actuating fluid temperature measured preferably at an outlet is above a maximum temperature, generating status information to indicate that the hot runner system is deactivated. In this case, as mentioned above, the heating element can be interrupted/power reduced or information can be generated to power down/shutoff the heating element by the switches or due to information to the injection molding system;

detecting by an air or oil pressure sensor that the hot runner valves and/or one or more actuators have not enough pressure to be operated, generating status information to indicate that the hot runner system is deactivated. In case the actuators are operated with not enough pressure, a leak can exist or a pressure pump is not working within the specs;

detecting by an air or oil pressure sensor that the one or more actuators are exposed to too much pressure to be operated so that the shutoff needle could damage the mold, generating status information to indicate that the hot runner system should be deactivated or the pressure line be closed. The deactivation of the pressure line comprises the reduction of the pressure in this line by opening a valve;

detecting by a temperature sensor that the one or more actuators of the hot runner nozzle are above a predefined temperature, generating status information to indicate that the hot runner system is deactivated;

detecting by a temperature sensor and a timer that one or more heating element zones of the manifold or nozzle or inlet nozzle are below a certain temperature level after a certain time limit, generating status information to indicate that the hot runner system is deactivated. A heating element zone is an area of the manifold that is preferably heated by a single heating element. Each of the heating element zones are monitored by a temperature sensor. In case the temperature is not within a predefined limit the valves can be closed to avoid damage of the manifold or other components like the nozzles;

detecting by a temperature sensor and a timer that a heating time exceeds a predefined limit in one or multiple zones and no operating cycle is detected, generating status information to trigger that the hot runner system is deactivated or that the heating element is disconnected or that the temperature of the heating element is reduced. There are types of plastic that can only be heated within a certain timespan to avoid quality losses. In case the timespan is too large, the properties of the plastic change and the product will lose its properties as well;

detecting by a temperature sensor and a timer a shutoff of the injection molding system if the temperature drops in a certain time below a predefined limit, generating status information to close the actuator before the melt solidifies. In case the machine is powered off, the pins of the nozzles have to be closed while the plastic/melt is still liquid enough otherwise the pins, the gate, the mold and the actuators can be damaged;

detecting with a temperature sensor and a timer that a temperature drop below a certain temperature is faster than a predefined threshold indicating that a plastic material solidifies, generating status information that the actuator should be deactivated so that they are not allowed to move to avoid the risk of damage. In this case, the melt is already solidified and the access to the actuators is interrupted by a switch or a valve;

detecting with a temperature sensor processing temperature is reached and heat up safety time is exceeded without running production cycles in case no cycles are detected, generating status information to indicate that the hot runner system or the heating element is deactivated or that the temperature of the heating element should be reduced. Also, here it is avoided that the plastic is exposed at a high temperature for a longer time span. In this context, an autonomous cycle detection is performed on the basis of the sensor information received;

detecting with a humidity sensor that humidity is above a predefined level indicates there is a cooling leakage. Based on this humidity information generating status information to indicate that the hot runner system or the heating element is deactivated or that the temperature of the heating element is reduced;

detecting with a flow sensor or a pressure sensor a leakage of cooling water. In case the flow or the pressure is below a certain level during a cycle, fluid to drive the actuator or cooling fluid might be leaking which leads to generate status information to indicate that the hot runner system is deactivated;

detecting with mechanical, electrical switches, temperature sensors or pressure sensor in risks areas of the hot runner system a melt leakage, generating status information to indicate that the hot runner system is deactivated;

detecting by a temperature sensor peeks withing the flow channel of the hot runner system; to determine the cycle time and/or the cycle number;

detecting by the movement sensor or the deformation sensor cycle time and/or cycle number; and detecting by a pressure sensor in a flow channel that the pressure is above a predefined value which is too high for the hot runner system; a valve pin driven by a hydraulic, electric or pneumatic actuator will close the inlet nozzle to avoid damage.

In a possible embodiment, the hot runner process controller according to the processing unit is configured to detect a preheating in a preheat station of the hot runner system and configured to select one or more operations mentioned above with values different from the molding operation. The preheating is detected by values delivered by one or more sensors, without further input. In a possible embodiment, a manual input from a user might be allowed. The preheating can be detected by the physical location of the hot runner system, by the connectors which are used, by the temperature curve and by the missing of cycles and the missing of pressure in the lines.

In a possible embodiment, if a preheating is detected and if a preheating temperature is reached and predefined time under allowed melt residence is exceeded in the processing unit and configured to generate information to deactivate the heating element or to lower the temperature. As mentioned above, certain types of plastic are not allowed to be heated too long without losing their properties.

In a possible embodiment, the hot runner process controller is configured to detect production cycles of the injection molding machine by use of the sensor values only and to select different stored data and program code for the operations mentioned above in comparison to the preheating. Consequently, the invention is able to detect both modes autonomously by the values generated by the sensors.

In a possible embodiment, the hot runner process controller, comprising one or more of the following components: network interface to send status information over network; display to indicate status information to user; keyboard to allow user input; output relay to provide status information; and serial interface to provide status information. This allows network messages to be sent to the user or to other devices like the injection molding machine can be addressed to provide corresponding information.

In a possible embodiment, the hot runner process controller comprising a means to provide a bypass function to bypass one or more of operations mentioned above and to force activation or deactivation of the hot runner system. In case an error has been detected, the user might want to reactivate the hot runner system. In this case, the user can force the hot runner process controller to deactivate or bypass certain functions, which prevent the injection molding process.

In a possible embodiment, the hot runner process controller comprises a means to log the activation of the bypass function and continue to record the incoming sensor data. In a possible embodiment, input means are necessary to enter a password to activate the bypass function.

In a possible embodiment, a power supply is provided by the connectors of the hot runner system, preferably by the connector of at least a minimum of one heating zone used in manual modus. This allows an easy integration by use of standard connectors which are used by the heating element. Also, older systems can be integrated.

In a possible embodiment, further switching means are used to switch one or more of the following: switching a power supply of the one or more heating elements; switching one or more magnet valves or change over valves to close or open one or more actuators; switching one or more magnet valves or change over valves to interrupt an actuating fluid flow from the injection molding machine to the one or more actuators; and switching sensor cables and/or thermocouples to provide simulated values to control the one or more heating elements to allow use of the same sensors as the injection molding system. Both systems share the same sensor; interrupting sensor cables and/or the thermocouples to simulate a broken sensor line and force the injection molding machine to stop heating the heating elements; detecting a pressure sensor in a flow channel that the pressure is above a predefined value which is too high for the hot runner system; and a valve pin driven by a hydraulic, electric or pneumatic actuator will close the inlet nozzle to avoid damage.

A further aspect of the invention is a method to monitor the status and operation of a hot runner-system. The hot runner system comprises: an inlet nozzle; one or more manifolds and one or more nozzles with actuator or without actuator; and one or more heating elements. The method is executed by a hot runner process controller which is self-operating and independent from the injection molding machine. The hot runner process controller has access to information of one or more sensors located on, in or at the hot runner system to detect the status and/or the operation of the hot runner-system. The hot runner process controller comprises: a processing unit and a memory, wherein the processing unit is connected to the one or more sensors, wherein the memory is storing data and program code, comprising the steps of: loading and executing by the processing unit the program code to compare sensor information with the stored data and to determine if the hot runner system is in an operable status; and in case the hot runner system is in an operable status, generating status information to activate the one or more heating elements and/or to open the one or more actuators; in case the hot runner system is in a non-operable status, generating status information to deactivate the one or more heating elements and/or to close the actuators.

BRIEF DESCRIPTION OF THE DRAWINGS

FIG. 11 shows the concept to close the inlet nozzle so that no high pressure can occur in the flow channel and the open position if the pressure is acceptable.

FIG. 12 shows the detection of a broken valve pin.

DETAILED DESCRIPTION

Figure 1:
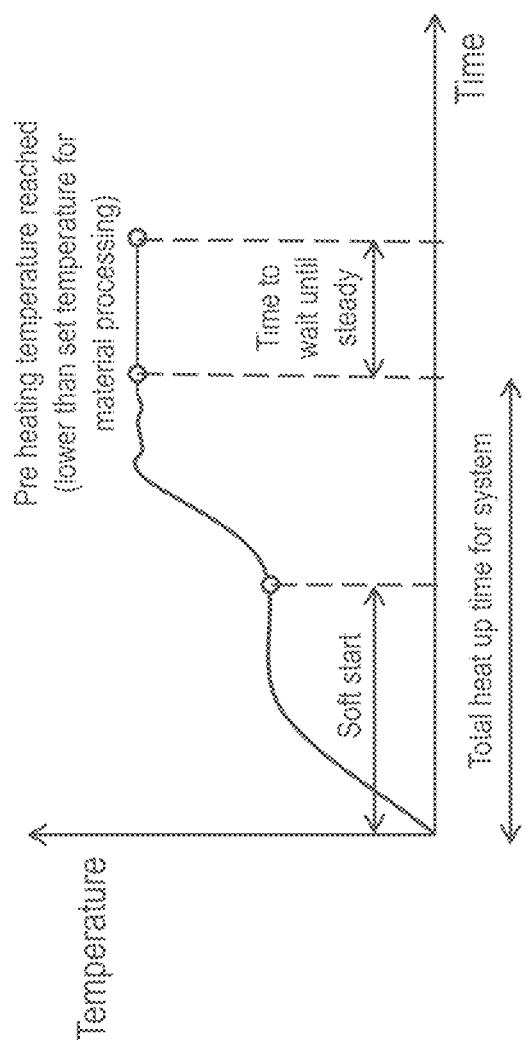
FIG. 1 is a pre-heating diagram in case a hot runner system is preheated on a preheating station.

The invention allows a control of the hot runner system also in a preheat station. FIG. 1 shows the temperature over a time. After a soft start at the beginning reaching a certain temperature level, steeper temperature rise is triggered until the preheating temperature is reached. This temperature can be measured by temperature sensors at different components like manifold, actuator, nozzle etc. After reaching the preset preheating temperature, a certain time is passed until the temperature is stable. The preheating temperature is lower than set temperature for material processing. Based on this pattern, the hot runner process controller is able to determine that the hot runner system is in a preheat station. The temperature pattern can be defined by the inclination over time or time intervals. It is also possible to instruct via an interface the hot runner process controller that the system is in a pre-heating station.

For example, when the hot runner process controller is activated (energized) and connected to the hot runner system and cooling water is running (for example at a minimum flow rate and maximum temperature on the outlet (e.g., 50° C.), the hot runner system can be heated up. In this context, information is generated to activate the heating elements. The activation of the heating elements can be performed by actively closing switches or relays which enable a current flow to the heating element, or by sending information to the injection molding system. This means a heating phase can be started when cooling fluid is running and if cooling temperature or actuator temperature does not exceed a preset maximum temperature. If for example the temperature exceeds the upper limit, information is be generated to automatically deactivate the heating element. It is then shut off by the hot runner process controller. The shutoff can be performed by the switches or relays switched permanently or temporarily until the temperature is below the preset maximum temperature.

When the hot runner process controller is activated (energized and connections to all relevant sensors are correct), the actuators do not exceed a predefined temperature and the plastic material in the flow channels is melted and the (fluid)

air or oil pressure is above a predefined lower limit and below a predefined upper limit the actuators can be activated and preheated.

A temperature sensor in the actuators is used to measure the temperature on or in the actuators (pneumatic or hydraulic or electric). This temperature should be below a certain temperature (e.g., 80° C.) to protect the actuators and/or the seals and/or the hydraulic oil and/or lubricants so the heating elements can stay activated.

All heating elements in all zones/areas need to preheat. This is measured by temperature sensors on/at the manifold in the zones/areas. In case one of the heating elements is not working or below a predefined temperature, a deactivation information is provided for all heating elements and/or actuators.

When the heating time exceeds a predefined time limit, for example 20 minutes on one or multiple zones without detecting one or more cycles, then information is generated to deactivate the heating elements and the power supply to all heating zones is stopped or set to a lower temperature. The predefined time and temperature limit depend on the plastic material. If the hot runner process controller detects that one or more heating zones have not reached a preset temperature, which might occur when a heating element or thermocouple is broken during start phase or after, an information to deactivate the system is generated.

All of the information can be used to run as an instruction to the injection molding machine to stop the heating of hot runner system, via an electronic interface (e.g., via Industry x.0 (4.0) connection like OPC UA, between hot runner process controller and injection molding machine). The exchange of information can be performed via cable, LAN, Bluetooth, USB, WLAN, 3G, 4G, 5G, etc. If connected, the hot runner process controller can control the injection molding machine (e.g., cause an alarm or send request to drop down hot runner system temperature). If a preheating temperature is reached and predefined time under allowed, and melt residence exceeds (for example 20 min), then the heating elements in the heating zones are deactivated to shut off or set to a lower temperature. In this case, information can be sent to customer (e.g., via information at screen/display, mail or app) about the deactivation/temperature reduction. In case the hot runner process controller is stand alone, which means that no connection to the injection molding machine is given, the deactivation happens with protection switches/relays installed between a plug interface and hot runner system heating elements. In case the hot runner process controller is connected to the injection molding machine, the deactivation information is sent to the injection molding machine to overrule the process running on the injection molding machine.

Figure 2:
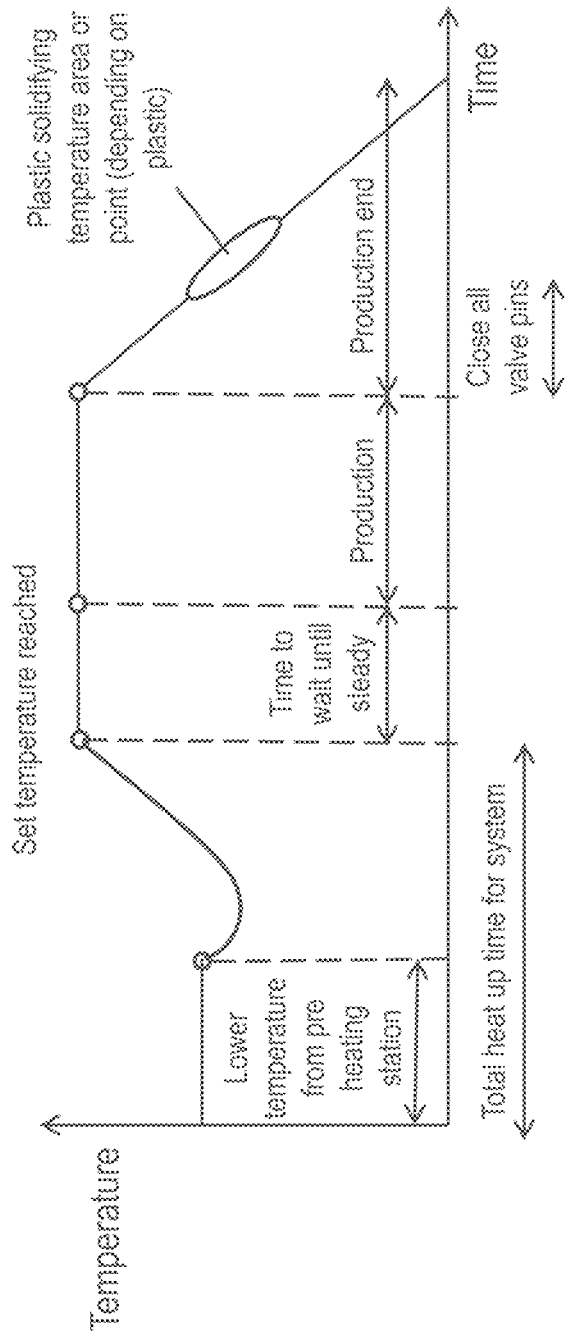
FIG. 2 shows a heating process with a start phase, using a mold coming from preheating station and being mounted and connected in an injection molding machine with a production and a production end.

FIG. 2 shows a heating process with a start phase using a mold coming from a preheating station and being mounted and connected in an injection molding machine, with a production start and a production end. After heating up the mold and hot runner in a preheating station, the hot runner system is connected to an injection molding machine. During the connection, the temperature drops. After the hot runner system is connected to the injection molding machine, the temperature for the injection molding process is reached at a higher level than in the preheating phase. Before the production can be started the temperature has to be stable. The invention monitors all these phases. After the heat up phase until processing temperature on molding machine is reached and the invention also monitors a safety time to make sure the melt has homogenously reached the set temperature. When the hot runner process controller is activated (energized and connection to all relevant sensors is OK) and connected to the hot runner system and, in case of an actuator on the hot runner system, cooling water is running at a minimum defined flow rate and maximum defined temperature on the outlet (e.g., 50° C.), the hot runner system is activated to be heated up. The heating phase is performed by activating the heating elements and can only be started when cooling fluid is running and if the cooling temperature or actuator temperature do not exceed a predefined temperature. If the temperature exceeds a predefined limit, then the heating element can be automatically deactivated and shut off.

Figure 3:
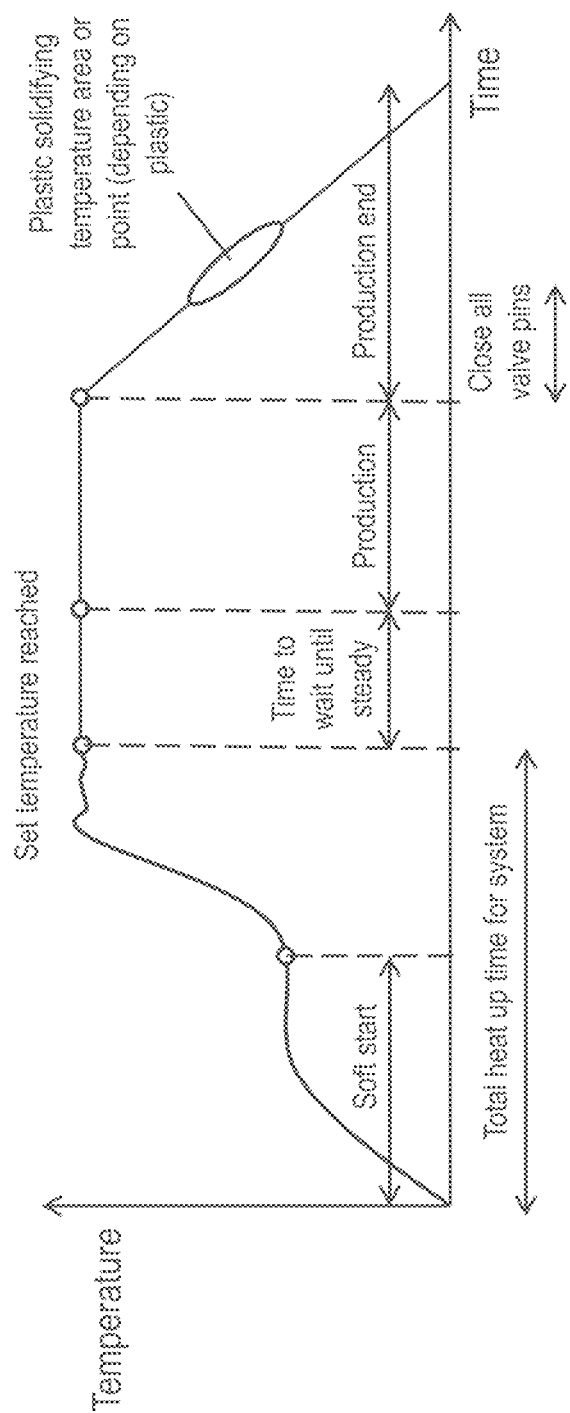
FIG. 3 shows a heating process with a start phase without using a preheating station with a production and a production end.

FIG. 3 shows a heating process with a start phase without using a preheating station, with a production and a production end. When the hot runner process controller is activated (energized and connection to all relevant sensors is OK) and the actuators do not exceed a predefined temperature and the plastic material in the flow channels is melted and the fluid (air or oil) pressure is above a predefined level the injection molding machine can be activated. Furthermore, to prevent the actuator is in use by the injection molding machine, the temperature is monitored. When the preset temperature is reached and steady, the actuators are activated which means that the injection molding machine can start its operation. Furthermore, the temperature measured by a sensor on/in the actuators (pneumatic or hydraulic or electric) should be below a certain temperature (e.g., 80° C.). When a preset temperature for the used plastic material is reached (it needs to be melted otherwise the system could be damaged) and an adequate additional time (depending on the plastic material) has passed to make sure the temperature is steady (e.g. 5 minutes) in all required areas, the injection molding machine is enabled and/or can start its operation.

When the sensors do not notice any production cycle and when heating time exceeds predefined limit, for example 20 minutes on one or multiple zones, then the components are deactivated which means the powering of all heating elements and the actuators are deactivated or triggered to close the valve by moving the valve pin to close the valve or if a connection to the injection molding machine is given, allowing an external control of the temperature, the temperature is reduced to a lower predefined temperature.

In a possible embodiment, the invention detects that one or more heating zones are not at preset temperatures. This can be caused by a heating element or thermocouple that is broken during the start phase or after the start phase. The injection molding machine should not run. Warning information is sent to the operator via screen, mail or app. As long as all the above-mentioned conditions are not fulfilled, information is sent via (Industry x.0) interface to the injection molding machine to disable the injection molding process. If however the predefined processing temperature has been reached and a predefined heat up safety time is exceeded without running any production cycles (no cycle is detected), then the invention will generate information to shut off all heating elements or, depending on the kind of plastic material, reduce the temperature via the interface.

Figure 4:
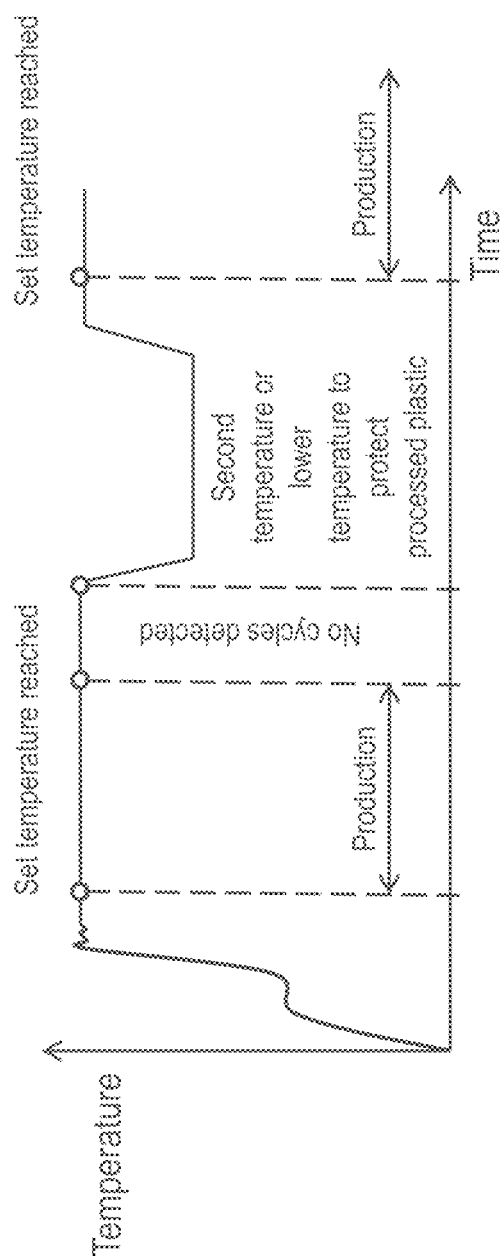
FIG. 4 shows for a cycle determination, a cycle interruption or no start of cycles.

In FIG. 4, the second temperature or lower temperature represents this scenario. In case the hot runner process controller has no interface to the injection molding machine, then a shut off can be performed with electrical switches installed between a customer plug interface and a heating element. The hot runner process controller is connected to a molding machine then deactivation information is sent to the molding machine.

The following preconditions need to be fulfilled to start the molding process: (1) When the hot runner process controller is activated (energized and connections to all relevant sensors are fine) and connected to the hot runner system and cooling water is running (at a minimum flow rate and maximum temperature on the outlet e.g. 50° C.), the hot runner system can continue to run. Heating can only continue to run when cooling fluid is running and if cooling temperature or actuator temperature do not exceed a predefined temperature. If the temperature exceeds an upper mentioned limit, then the heating element can be automatically deactivated; (2) When the hot runner process controller is activated (energized and connections to all relevant sensors are OK) and connected to the hot runner system and the heating elements are running, the hot runner system can continue to run; (3) When the hot runner process controller is activated (energized and connections to all relevant sensors are OK) and connected to the hot runner system and the air or oil pressure is correct, the hot runner system can continue to run; (4) When the temperature on/in the actuators (pneumatic, hydraulic or electric) is below a certain temperature (e.g. 80° C.), the hot runner system can continue to run; (5) When a preset temperature for the used plastic material is reached (it needs to be melted otherwise the system could be damaged; it also needs to be below a certain temperature to not damage the material), the hot runner system can continue to run; and (6) If a plastic material depending time is exceeded without running production cycles (no cycle detected), then automatically deactivation information is generated for all heating zones; or depending on the plastic material information is sent to reduce the temperature via interface to injection machine, or the power supply for the heating elements are modulated to reduce the temperature.

In case the hot runner process controller is standalone, then shutoff is performed with a protection switch installed between customer plug interface and hot runner system heating elements. If the hot runner process controller is connected to the molding machine and/or external hot runner system controller, then shut off information is sent to one of the mentioned devices.

FIG. 3 shows an example where the valve pin needs to be closed before plastic material solidifies. After the production stops, the temperature drops. The invention detects the drop and the stop of the production due to the missing cycles and the dropping temperature. The hot runner process controller receives information about the status of the valves and the valve pins. Sensors to detect the location of the valve pins or the pressure in the lines etc. allow to determine the valve pin position. In case a connection to the injection molding machine is given, information is sent to close the valve pins as long as the material is not solidified. If the material is already solidified, information is sent not to close the valve pins. If there is no connection, the invention can trigger valves (e.g. check valve; proportional valve) with full open, full close function, servos etc. to drive the actuator directly, or in case the material has solidified, to interrupt operation of the injection molding machine.

Figure 5:
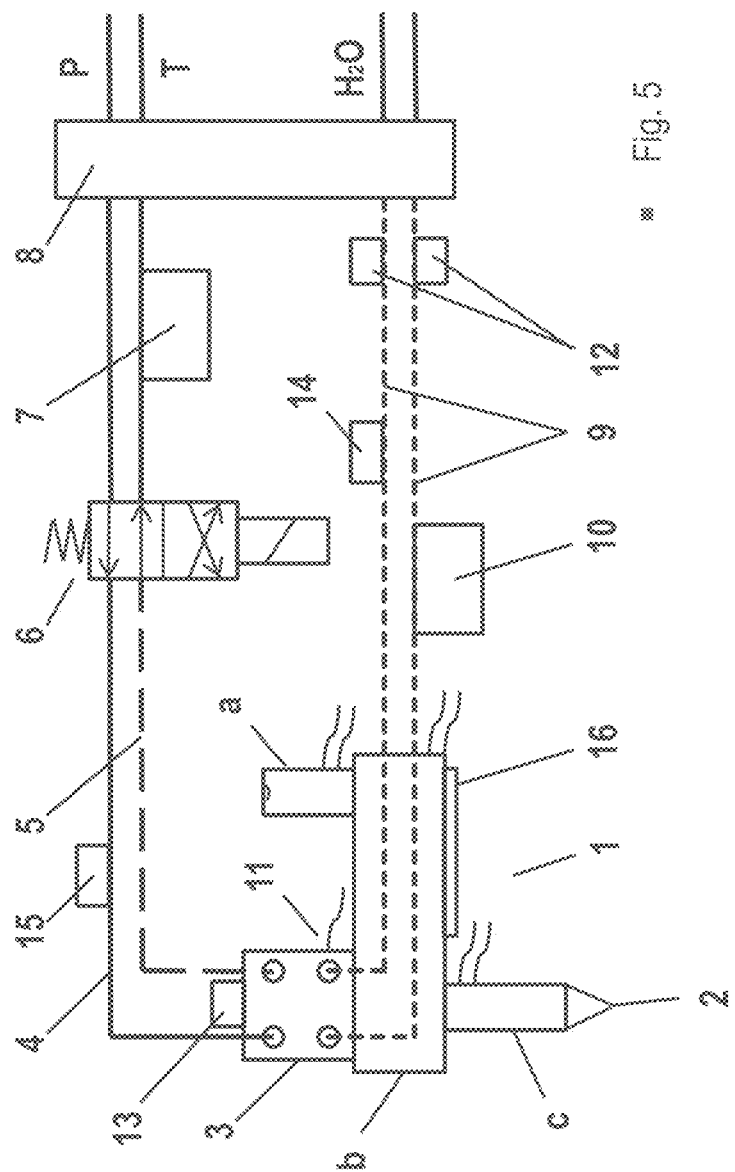
FIG. 5 shows a hot runner system with a hydraulic or pneumatic actuator and magnet valves or change over valves to open or close the actuators to open or close the valve pin, included in the hot runner system.

FIG. 5 shows a hot runner system 1 comprising an inlet nozzle, a manifold b, an actuator 3 and a nozzle c. The nozzle comprises a gate 2 to be open or closed by a valve pin. The valve pin is driven by an actuator 3 (hydraulic or pneumatic) to drive open or closing of the valve pin. The actuator is driven by a fluid where there is a valve pin close pipe/hose/line 4 and a valve pin open pipe/hose/line 5. A further valve 6 is configured as a change-over valve or a solenoid valve. In the lines 4 and/or 5, a sensor 7 is located detecting any movements of an actuation medium. The lines 5 and 4 are coupled to a fluid tank and pump or pressure and exhaust valve via a coupling plate or block 8. An additional cooling circuit 9 is established to cool the valves and/or actuators also coupled via a coupling plate or block 8. A sensor 10 can be used to detect movements of a cooling medium. In a possible embodiment, the sensor is used to detect movements and amount per time of the cooling fluid. A temperature sensor 11 is used to detect if the actuator temperature has exceeded a preset value. A further sensor 12 is used to detect the cooling medium temperature at the cooling exit and entry of the cooling lines. Sensor 13 is used to detect the valve pin position, which can be used to determine a cycle or the status in which the process is at the moment. Sensor 14 is used to detect air humidity (e.g. to detect cooling water leakage). A vibration sensor 15 is used to detect a movement or vibrations of the hot runner system. The sensor can be used to detect cycles (e.g. as a cycle counter and/or cycle time). A strain gauge or bending sensor 16 is used to detect a bending of the hot runner or mold.

Figure 6:
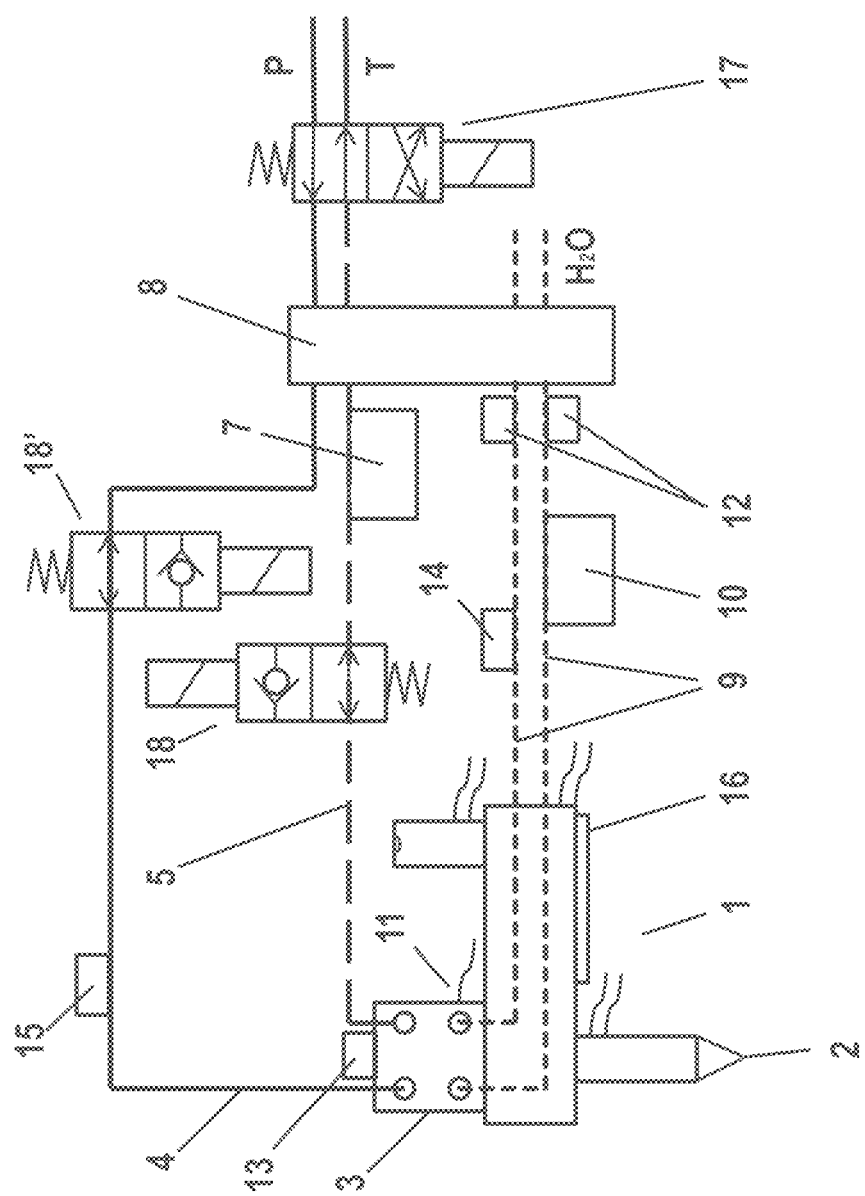
FIG. 6 shows a hot runner system with hydraulic or pneumatic actuator and actuator (solenoid) valves to open or close the valve pin driven by the injection molding machine and additional solenoid valves in the hot runner system to interrupt the pressure line powered by the injection machine.

FIG. 6 shows an embodiment where the drive valve 17 (change over) is introduced which is powered by the injection molding machine to operate the actuator. To interrupt the operation of the actuator by the invention, valves 18 and/or 18' can be solenoid driven and introduced into the lines to block the media flow. This allows the invention to stop the fluid flow and the operation of the actuator.

Figure 7:
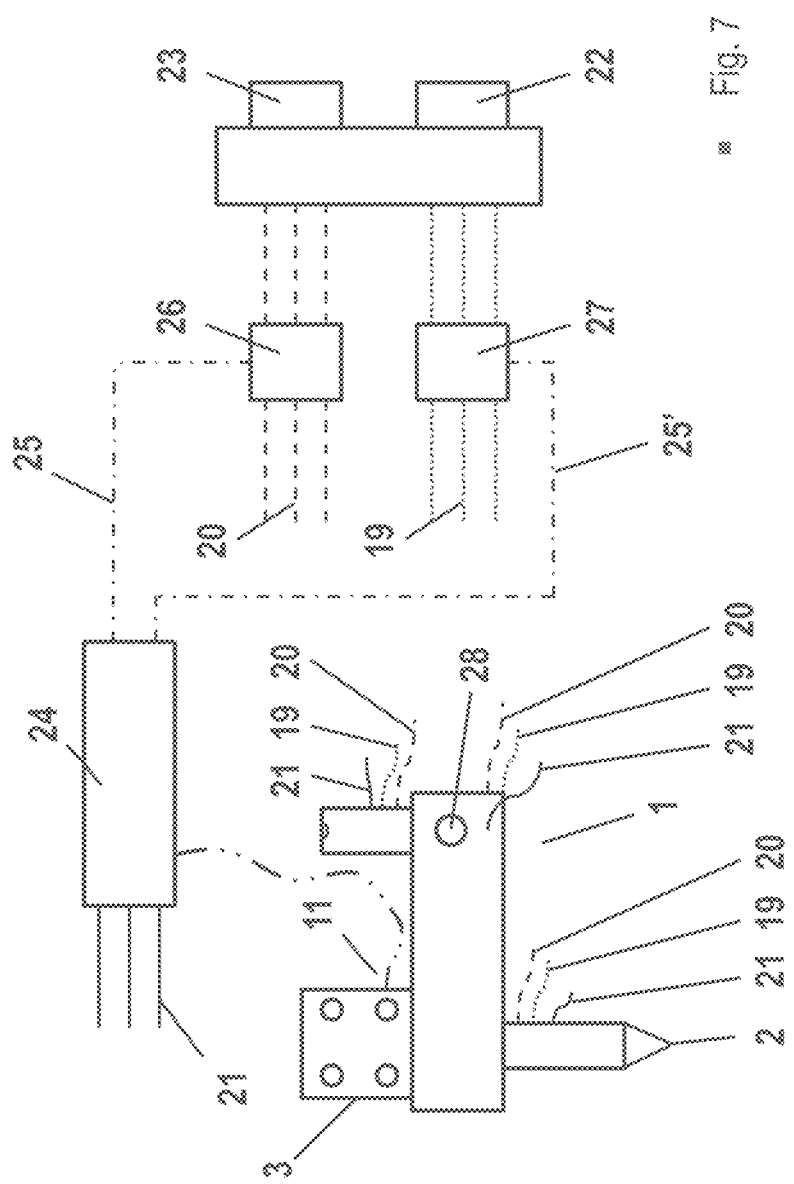
FIG. 7 shows a hot runner system with wiring schema or a deactivation.
Figure 8:
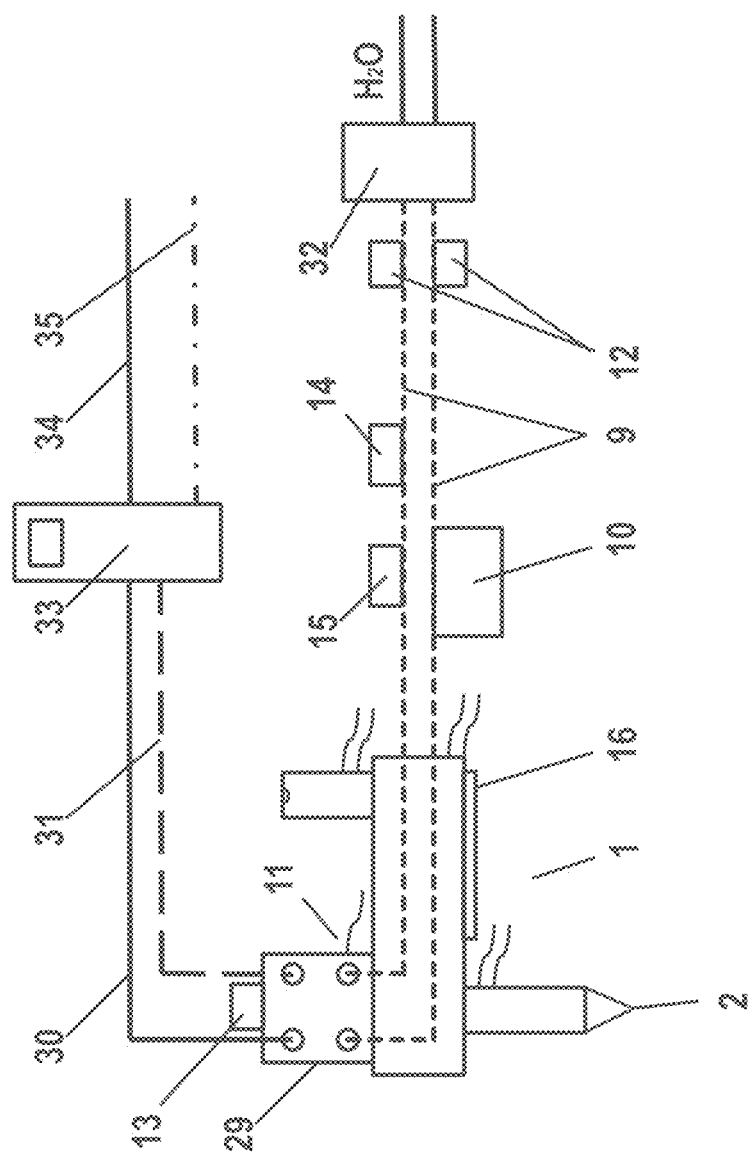
FIG. 8 shows a hot runner system with an electric actuator and hot runner process controller to open or close the valve pin provided with the hot runner system.

FIG. 7 shows an embodiment where the valve is driven by an electric actuator. FIG. 7 shows a power cable 19 for heating elements (P; N). Sensor cables 20 as a thermocouple cables (+; −) are connected to a switch or contactors or relay or relays to switch the thermocouple cables or connections to modify the sensor values having an impact on the injection molding machine. A parallel use of a thermocouple/sensor by the injection molding machine is not possible when an additional cable 21 from an additional thermocouple is introduced to supervise the temperature if split supervising with one thermocouple is not possible. Interface 22 is used for providing power to the invention.

Interface 23 is used to connect the injection molding machine to allow a temperature control (to temperature sensor, which can also be mixed wired on one or several plugs with power). A hot runner process controller 24 is connected to the switches 26 to interrupt or switch the thermocouples, and to switches 27, to interrupt the power supply for the heating elements, thus, enabling or disabling the heating elements. The connection is established by line 25 to switch a thermocouple/temperature sensor into an interrupted position or to a voltage position where the injection molding machine interprets the values as hotter than allowed, which triggers the injection molding machine to reduce the temperature. Line 25' is used to switch the power line to a disconnected position. Switch 26 is used to switch a thermocouple/temperature sensor connection. Switch 27 is used to interrupt the power line. The temperature sensor 28, which can be a thermocouple, is located in the flow channel. Switching the power cable to the heating elements via an electric conductor, if the hot runner process controller determines that certain parameters are out of range, is also a possibility to reduce the temperature.

In FIG. 7, the hot runner process controller switches the thermocouple connection by a relay if the "hot runner process controller" generates information that certain parameters are out of range. The thermocouple communication to the injection molding machine is interrupted. The injection molding machine should show a broken thermocouple/temperature sensor and stop providing power to the heating elements. In a possible embodiment, the hot runner process controller simulates a voltage on the thermo coupler/ temperature sensor indicating that a certain temperature is exceeded, which results in the reaction of the injection molding machine to reduce the heat at the heating elements. The injection molding machine will then reduce the voltage for the heating elements resulting in temperature drop. The use of a direct connection to the injection molding machine can lead to a reduction of the temperature or shut off triggered executed by the injection molding machine itself. This switching of the thermocouple/temperature sensor connection to the injection molding machine can also be used, depending on plastic material and no cycles are running/determined for a given time to protect the plastic material from degrading. Another option is to interrupt the thermocouple/temperature sensor communication to the injection molding machine. The injection molding machine should show a broken thermocouple/temperature sensor and stop providing power to the heating elements.

If all this is not the case and the temperature drops (e.g., 10° C.) below a preset temperature, the invention generates an information that a closing of the valve pin is avoided. This is to prevent the closing of the valve pin and will lead to damage because of too cold (hardened) plastic material. If a temperature drops really fast below a certain temperature (when the plastic material solidifies), the valve pin should not be allowed to move because of the risk of damage.

In a possible embodiment, the hot runner process controller has a bypass function that allows to go on with production by bypassing one or more of the mentioned deactivation information. The activation of the bypass function should be logged. The bypass function is only activated after entering a password and all data during the bypassed is logged.

The hot runner process controller has an extensive leakage detection to prevent damage (e.g., overheating or electrical short circuits) which is implemented by plastic leakage detectors and show if plastic material is in an area where it does not belong. The content of the application (U.S. application Ser. No. 16/802,874) is introduced herein with reference. Flow sensors of cooling water or oil are used to determine derivation of standard flow amount. If a certain amount is exceeded, a leakage is probable and information has to be generated to deactivate the system. The same approach can be used for air or other fluids. Pressure sensors could be used for the leak detection. Furthermore, predefined information patterns can be used to determine a leak. Sudden repetitive pressure loss might indicate a leak.

Figure 9:
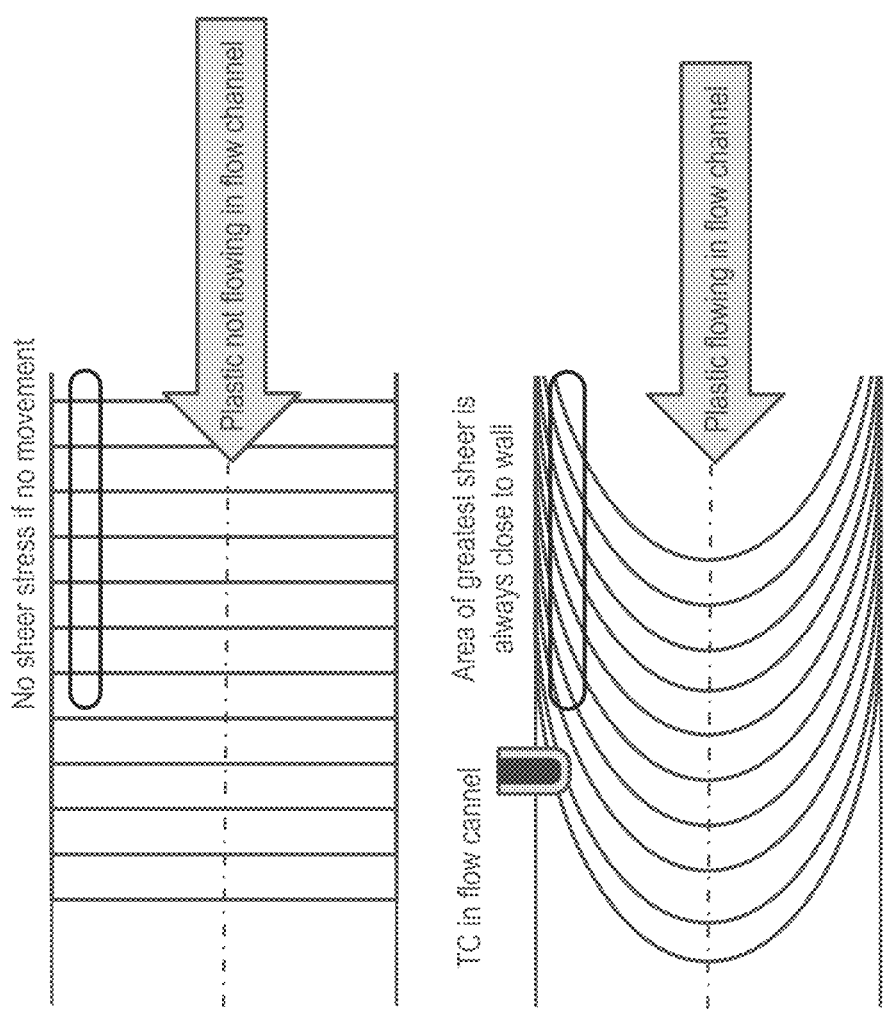
FIG. 9 shows the friction in flow channel used to determine a cycle.

FIG. 9 shows a cycle counter thermocouple/temperature sensor in a flow channel which measures the melt temperature deviation created during a short period of dynamic injection (shear heating) to count the number of cycles. Together with a timer it is also possible to detect the cycle time since the injection melt temperature, after an injection drops because no shear heating can occur anymore, can be derived from FIG. 9. The invention is able to determine the cycle number, the cycle length, and by a combination of other sensors like the pressure sensor and/or the position sensor in an actuator. The cycle count also allows to generate information to propose a maintenance after a certain number of cycles. For this purpose, a limit switch on hydraulic, pneumatic or electrical actuators or potentiometer on hydraulic, pneumatic or electrical actuators or Hall sensors, inductive sensors, piezosensors, ultrasonic sensors, optical sensors can be used as cycle counters. An optical sensor mounted on cable channel with a seal to detect light via a bore in the mold to the parting line if the mold is open or closed can also be used to determine a cycle and the cycle time. A bending sensor (e.g. resistive wire strain) to detect deformation (e.g. of the manifold when the machine injection nozzle hits the inlet nozzle of the manifold) can also be used to determine a cycle and the cycle time. Vibration sensors can detect an open or closed movement of the mold which indicates vibrations on pipes or hoses by using oil or hydraulic pressure to open or close the valve pin. Also, this information can be used to determine a cycle and the cycle time. When using a pressure sensor, a pressure changes at every injection cycle in the flow channel. Acoustic sensors can be determined. Also, an acoustic sensor can be used (e.g., closing of mold will be acoustically detectable). All these sensors can be used alone or in combination to determine a cycle and the cycle time.

All of these sensors can be used to determine if cycle time is not constant or a pause is exceeded. If exceeded, the system needs to (produce an alarm) reduce the heat for certain plastic material (risk of degenerated plastic material of even risk of explosion). Information should to be generated to warn the operator or deactivate the injection molding machine.

Figure 10:
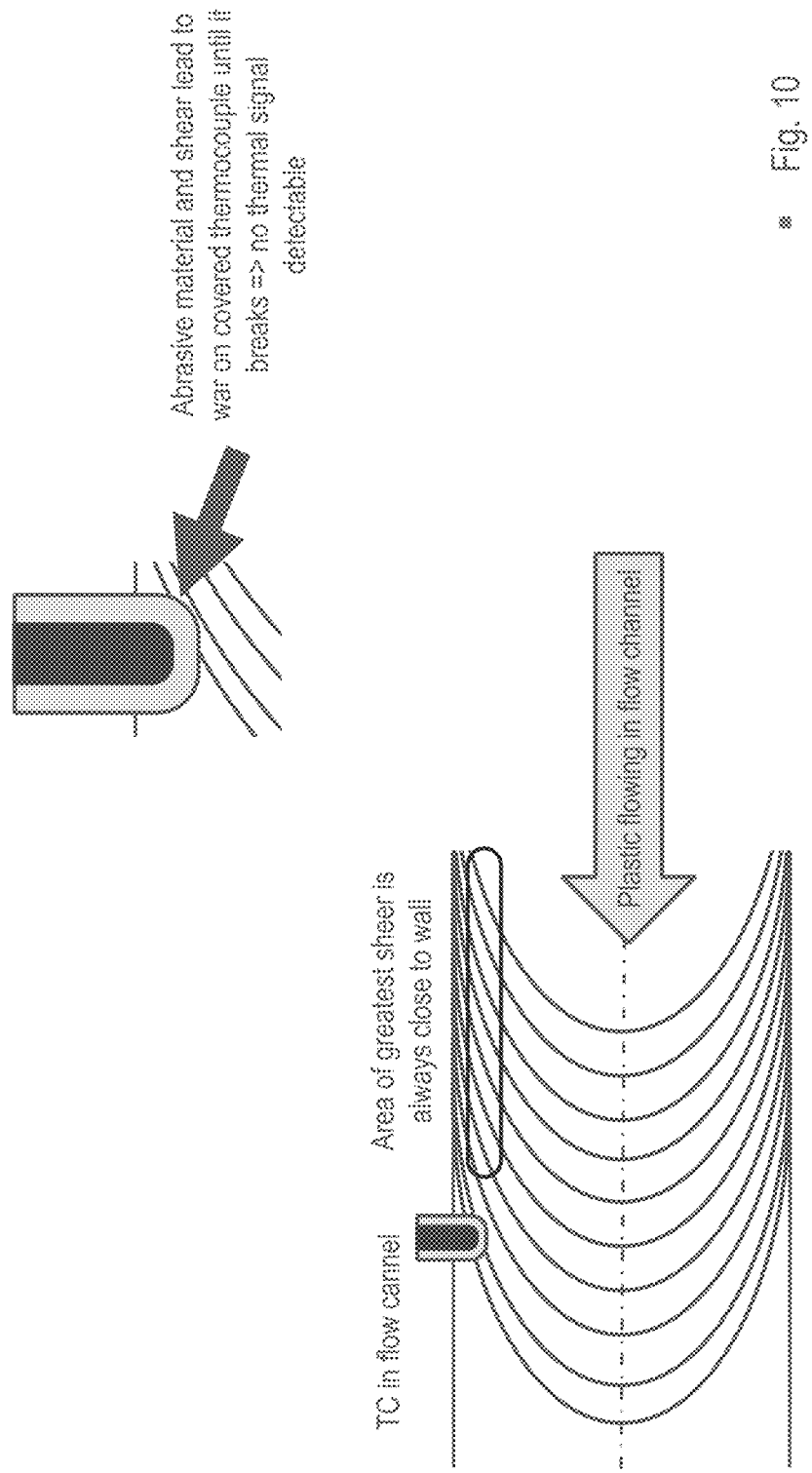
FIG. 10 shows ware detection via a covered thermocouple.

FIG. 10 shows a ware detection. After a certain period, a thermocouple/temperature sensor with an additional protecting wall thickness or coating placed in a flow channel will not detect any temperature if it is washed away caused by the plastic material (e.g., filled with glass fiber). This information alone or together with cycle numbers can be used to generate information that all flow channels, valve pins, gates, are worn. This information can be used to shut down the system or to allow the production to continue for a predefined number of cycles.

According to FIG. 12, a limit switch on hydraulic, pneumatic or electrical actuators can be used to possibly detect a broken valve pin. In this case, the piston still can move the full stroke but not the valve pin in case it is broken. Other sensors (e.g., Hall sensors, inductive sensors, piezosensors, ultra-sonic sensors, optical sensors) that also can detect movement could be used alone or in combination to detect a broken valve pin. A tracing of the thermocouples on heating elements can be implemented to detect peek heat and time in use from each heating zone or from a single zone. After a defined number of peek heats and time of use, information is generated to propose an exchange of the heating element. The ampere over live time used by heating elements can be determined by a current sensor, and the information used to propose a change of the heating element. Too high plastic melt pressure could damage parts in the hot runner system. Information is generated to indicate this error to deactivate the injection molding machine or to switch a valve at the inlet nozzle to protect the manifold.

In FIG. 11, valve pin 36 in the inlet nozzle is in a closed position, which stops the flow of plastic. However, valve pin 37 in the inlet nozzle is in the open position which allows a flow of plastic. FIG. 12 shows a broken valve pin detection. Often, a valve pin breaks in the valve pin head area where it is hung up in a rod of a piston of the actuator. If the valve pin head is broken, the piston can still move but the valve pin would not. To find a solution for this problem between the actuator and the manifold, a sensor can be placed to supervise if the valve pin is still moving. This can be done by an elongation leading out to a thermal less hot area, so that the sensor is protected. If there is enough space or by moving the actuator away from the manifold (longer supports), the sensor can be placed directly on the valve pin.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

LIST OF REFERENCE NUMERALS

1=Hot runner system (inlet nozzle, manifold, actuator, nozzle)
a=Inlet nozzle
b=Manifold
c=Nozzle
2=Gate to be opened or closed by valve pin
3=Actuator (hydraulic or pneumatic) to drive open or closing of valve pin
4=Valve pin close pipe/hose
5=Valve pin open pipe/hose
6=Solenoid valves
7=Sensor to detect movement of actuation medium
8=Coupling to customer driving power supply (air, oil, electric) and cooling
9=Cooling circuit
10=Sensor to detect movement of cooling medium or sensor to detect movement and amount per time
11=Temperature sensor to detect if temperature of actuator is exceeded
12=Sensor to detect cooling medium temperature at the cooling exit and entry
13=Sensor to detect valve pin position
14=Sensor to detect air humidity (e.g. to detect cooling water leakage)
15=Vibration sensor to detect movement or vibrations. Can be used to detect cycles (e.g. as a cycle counter)
16=Strain gage or sensor to detect bending of hot runner or mold
17=Customer driven solenoid valve 18 and or 18'=Solenoid driven valve to block media flow
19=Power cable for Heaters (P; N)
20=Thermocouple cable (+; −)
21=Cable from additional thermocouple to supervise temperature if split supervising with original thermocouple is not possible
22=Interface to customer plug for power
23=Interface to customer plug for temperature control (can also be mixed wired on one or several plugs with power)
24=Hot runner process controller
25=Line to switch thermocouple/temperature sensor into a interrupted position or to a voltage position where the customer controller thinks the system is hotter than allowed
25'=Line to switch the power line to disconnected
26=Contactor or contactors or relay or relays to switch thermocouple/temperature sensor connection
27=Contactor or Contactors to interrupt the power line
28=Thermocouple in flow channel
29=e-actuator to drive open or closing of valve pin
30=Power line for e-actuator
31=Sensor line for e-actuator
32=Coupling to customer cooling
33=Controller for e-actuators
34=Power line (e.g. 230V) form customer
35=Signal line from injection machine e. g. for injection start signal
36=Valve pin in inlet nozzle in close position=>Flow of plastic is stopped/not possible
37=Valve pin in inlet nozzle in open position=>Flow of plastic is allowed

What is claimed is:

1. A hot runner system comprising:
one or more manifolds;
an inlet nozzle to the manifold;
one or more outlet nozzles from the manifold;
one or more heating elements;
one or more sensors located on, in or at the hot runner system to detect a status or operation of the hot runner system; and
a process controller having a processing unit and a memory, wherein the processing unit is connected to the one or more sensors, wherein the processing unit is configured to load and execute program code to compare sensor information with data stored in the memory to determine whether the hot runner system is in an operable status, and, in case the hot runner system is in an operable status, activate the one or more heating elements and/or the one or more actuators enabling a production operation, and, in case the hot runner system is not in an operable status, configured to generate status information to deactivate the one or more heating elements and close or deactivate the one or more actuators disabling a production operation of the injection molding machine;
wherein the hot runner further comprises a switching unit spatially grouping the switches for heating zone and/or temperature sensors and/or valves, wherein the one or more switches are placed between cables from heating zones and/or temperature sensors and/or valves, and hot runner connectors.

2. The hot runner system of claim 1, wherein the sensors comprise at least one of a temperature sensor to detect a temperature of one or more components of the hot runner system or of a cutout within the components of the hot runner system or within a flow channel of the hot runner; a humidity sensor to detect a humidity surrounding the hot runner system; a flow sensor to detect flow of fluids or melt; a pressure sensor to detect pressure in fluids or melt; a leak sensor detecting a leak in fluid lines and/or areas with possible plastic leakage and/or the inlet nozzle and/or in the one or more manifolds, the one or more hot runner nozzles and/or actuators; a bending sensor attached to the hot runner system to detect deformation; a vibration sensor to detect a movement of the hot runner system; an acoustic sensor to detect a sound of an operations with respect to the hot runner system; a gyro-sensor to detect a movement of the hot runner system; a potentiometer or encoder on hydraulic, pneumatic or electrical actuator to detect a movement within the nozzle, to determine a location of a nozzle pin and/or a cycle time and/or a cycle number; a limit switch on hydraulic, pneumatic or electrical actuators to determine a location of a needle of the hot runner nozzle and/or the cycle time and/or the cycle numbers; an optical sensor mounted on a mold or the hot runner system to detect light via a bore in the mold to a parting line if the mold is opened or closed; and a sensor for wear detection, to detect if a wall or other components of the one or more manifolds are washed out or if the one or more heating elements reach the end of life time or if the nozzle pin is broken.

3. The hot runner system of claim 1, further comprising one or more switches and/or valves located in connection between the injection molding machine and the hot runner system allowing interruption of the operation of the injection molding machine or closing of the inlet nozzle with a valve pin, wherein the switches and/or valves are operated by the processing unit on the basis of the status information generated using the one or more sensor, to activate or deactivate the control of the hot runner system by the injection molding machine.

4. The hot runner system of claim 1, further comprising a signal line connectable to the injection molding machine to provide the status information, to indicate the operations status of the hot runner system, so that the injection molding machine can be controlled by the status information.

5. The hot runner system of claim 1, wherein the processing unit is configured to perform one or more of the following operations:
   (a) detecting by a flow sensor and a temperature sensor if a cooling and/or actuating fluid in the one or more actuators of the hot runner system is running at a predefined minimum flow rate and below a predefined maximum temperature measured at an outlet of the cooling and/or actuating fluid, and generating status information to indicate that the one or more heating elements of the hot runner system should not be deactivated;
   (b) detecting by a temperature sensor that a cooling and/or actuating fluid temperature measured at an outlet is above a predefined maximum temperature, and generating status information to indicate that the hot runner system should be deactivated;
   (c) detecting by an air or oil pressure sensor that the hot runner valves and/or one or more actuators are driven below a predefined minimum pressure to be operated, and generating status information to indicate that the hot runner system should be deactivated;
   (d) detecting by an air or oil pressure sensor that the one or more actuators are exposed to pressure above a predefined limit to be operated so that a valve pin could damage the mold, and generating status information to indicate that the hot runner system should be deactivated or the pressure line should be closed;
   (e) detecting by a temperature sensor that the one or more actuators of the hot runner nozzle are above a predefined temperature, and generating status information to indicate that the hot runner system should be deactivated; detecting by a temperature sensor and a timer that one or more heating element zones of the one or more manifolds or nozzle or inlet nozzle are below a certain temperature level after a certain time limit, and generating status information to indicate that the hot runner system should be deactivated;
   (f) detecting by a temperature sensor and a timer that a heating time exceeds a predefined limit in on one or multiple zones and no operating cycle is detected, and generating status information to deactivate the hot runner system or to deactivate the heating elements or temporarily deactivate the heating elements to reduce the temperature or activate a predefined lower temperature;
   (g) detecting by a temperature sensor and a timer a shut off of the injection molding system if the temperature drops in a certain time below a predefined limit, and generating status information that the one or more actuators should be activated to close the one or more actuators before the melt solidifies;
   (h) detecting by a temperature sensor and a timer that a temperature drops below a certain temperature is faster than a predefined threshold, indicating that a plastic material solidifies, and generating status information that the one or more actuators should be deactivated;
   (i) detecting by a temperature sensor that a processing temperature is reached and a heat up safety time is exceeded without running production cycles in case no cycles are detected, and generating status information to indicate that the hot runner system or the one or more heating elements should be deactivated or that the temperature of the one or more heating elements should be reduced;
   (j) detecting by a humidity sensor that a humidity is above a predefined level indicating that there is a cooling leakage generating status information to indicate that the hot runner system or the one or more heating elements should be deactivated;
   (k) detecting by a flow sensor or a pressure sensor a leakage of cooling water and/or of fluid to drive the one or more actuators, and generating status information to indicate that the hot runner system should be deactivated;
   (l) detecting by mechanical, electrical switches, temperature sensors or pressure sensors in areas with possible melt leakages of the hot runner system, and generating status information to indicate that the hot runner system should be deactivated if a leak occurs;
   (m) detecting by a temperature sensor peeks within the flow channel of the hot runner system to determine the cycle time and/or the cycle number;
   (n) detecting by the movement sensor or the deformation sensor cycle time and/or cycle number; and
   (o) detecting by a pressure sensor in a flow channel that the pressure is above a predefined value which is too high for the hot runner system, a valve pin driven by a hydraulic, electric or pneumatic actuator will close the inlet nozzle to avoid damage.

6. The hot runner system of claim 1, further comprising at least one of a network interface to send status information over network; a display to indicate status information to user; a keyboard to allow user input; an output relay to provide status information; and serial interface to provide status information.

7. The hot runner system of claim 1, further comprising a switch for switching a power supply of the one or more heating elements; switching one or more magnet valves or change over valves to close or open one or more actuators; switching one or more magnet valves or change over valves to interrupt an actuating oil flow from the injection molding machine to the one or more actuators; switching sensor cables and/or temperature sensors to provide simulated values, to control the one or more heating elements; and/or interrupting sensor cables and/or the temperature sensors to simulate a broken sensor line and force the injection molding machine to stop heating the heating element.

8. A hot runner system comprising:
   one or more manifolds;
   an inlet nozzle to the manifold;
   one or more outlet nozzles from the manifold;
   one or more heating elements;
   one or more actuators controlling flow from the outlet nozzles;
   one or more sensors located on, in or at the hot runner system to detect a status or operation of the hot runner system; and
   a process controller having a processing unit and a memory, wherein the processing unit is connected to the one or more sensors, wherein the processing unit is configured to load and execute program code to compare sensor information with data stored in the memory to determine whether the hot runner system is in an operable status, and, in case the hot runner system is in an operable status, activate the one or more heating elements and the one or more actuators enabling a production operation, and, in case the hot runner system is not in an operable status, configured to generate status information to deactivate the one or more heating elements and close or deactivate the one or more actuators disabling a production operation of the injection molding machine;

wherein the processing unit is configured to perform one or more of the following operations:

(a) detecting by a flow sensor and a temperature sensor if a cooling and/or actuating fluid in the one or more actuators of the hot runner system is running at a predefined minimum flow rate and below a predefined maximum temperature measured at an outlet of the cooling and/or actuating fluid, and generating status information to indicate that the one or more heating elements of the hot runner system should not be deactivated;

(b) detecting by a temperature sensor that a cooling and/or actuating fluid temperature measured at an outlet is above a predefined maximum temperature, and generating status information to indicate that the hot runner system should be deactivated;

(c) detecting by an air or oil pressure sensor that the hot runner valves and/or one or more actuators are driven below a predefined minimum pressure to be operated, and generating status information to indicate that the hot runner system should be deactivated;

(d) detecting by an air or oil pressure sensor that the one or more actuators are exposed to pressure above a predefined limit to be operated so that a valve pin could damage the mold, and generating status information to indicate that the hot runner system should be deactivated or the pressure line should be closed;

(e) detecting by a temperature sensor that the one or more actuators of the hot runner nozzle are above a predefined temperature, and generating status information to indicate that the hot runner system should be deactivated; detecting by a temperature sensor and a timer that one or more heating element zones of the one or more manifolds or nozzle or inlet nozzle are below a certain temperature level after a certain time limit, and generating status information to indicate that the hot runner system should be deactivated;

(f) detecting by a temperature sensor and a timer that a heating time exceeds a predefined limit in on one or multiple zones and no operating cycle is detected, and generating status information to deactivate the hot runner system or to deactivate the heating elements or temporarily deactivate the heating elements to reduce the temperature or activate a predefined lower temperature;

(g) detecting by a temperature sensor and a timer a shut off of the injection molding system if the temperature drops in a certain time below a predefined limit, and generating status information that the one or more actuators should be activated to close the one or more actuators before the melt solidifies;

(h) detecting by a temperature sensor and a timer that a temperature drops below a certain temperature is faster than a predefined threshold, indicating that a plastic material solidifies, and generating status information that the one or more actuators should be deactivated;

(i) detecting by a temperature sensor that a processing temperature is reached and a heat up safety time is exceeded without running production cycles in case no cycles are detected, and generating status information to indicate that the hot runner system or the one or more heating elements should be deactivated or that the temperature of the one or more heating elements should be reduced;

(j) detecting by a humidity sensor that a humidity is above a predefined level indicating that there is a cooling leakage generating status information to indicate that the hot runner system or the one or more heating elements should be deactivated;

(k) detecting by a flow sensor or a pressure sensor a leakage of cooling water and/or of fluid to drive the one or more actuators, and generating status information to indicate that the hot runner system should be deactivated;

(l) detecting by mechanical, electrical switches, temperature sensors or pressure sensors in areas with possible melt leakages of the hot runner system, and generating status information to indicate that the hot runner system should be deactivated if a leak occurs;

(m) detecting by a temperature sensor peeks within the flow channel of the hot runner system to determine the cycle time and/or the cycle number;

(n) detecting by the movement sensor or the deformation sensor cycle time and/or cycle number; and (o) detecting by a pressure sensor in a flow channel that the pressure is above a predefined value which is too high for the hot runner system, a valve pin driven by a hydraulic, electric or pneumatic actuator will close the inlet nozzle to avoid damage;

wherein the processing unit is configured to detect a preheating in a preheat station of the hot runner system and configured to select one or more operations (a) to (o) with values different from the molding operation.

9. A hot runner system comprising:
one or more manifolds;
an inlet nozzle to the manifold;
one or more outlet nozzles from the manifold;
one or more heating elements;
one or more actuators controlling flow from the outlet nozzles;
one or more sensors located on, in or at the hot runner system to detect a status or operation of the hot runner system; and
a process controller having a processing unit and a memory, wherein the processing unit is connected to the one or more sensors, wherein the processing unit is configured to load and execute program code to compare sensor information with data stored in the memory to determine whether the hot runner system is in an operable status, and, in case the hot runner system is in an operable status, activate the one or more heating elements and/or the one or more actuators enabling a production operation, and, in case the hot runner system is not in an operable status, configured to generate status information to deactivate the one or more heating elements and close or deactivate the one or more actuators disabling a production operation of the injection molding machine wherein the processing unit is configured to perform one or more of the following operations:

(a) detecting by a flow sensor and a temperature sensor if a cooling and/or actuating fluid in the one or more actuators of the hot runner system is running at a predefined minimum flow rate and below a predefined maximum temperature measured at an outlet of the cooling and/or actuating fluid, and generating status information to indicate that the one or more heating elements of the hot runner system should not be deactivated;
(b) detecting by a temperature sensor that a cooling and/or actuating fluid temperature measured at an outlet is above a predefined maximum temperature, and generating status information to indicate that the hot runner system should be deactivated;
(c) detecting by an air or oil pressure sensor that the hot runner valves and/or one or more actuators are driven below a predefined minimum pressure to be operated, and generating status information to indicate that the hot runner system should be deactivated;
(d) detecting by an air or oil pressure sensor that the one or more actuators are exposed to pressure above a predefined limit to be operated so that a valve pin could damage the mold, and generating status information to indicate that the hot runner system should be deactivated or the pressure line should be closed;
(e) detecting by a temperature sensor that the one or more actuators of the hot runner nozzle are above a predefined temperature, and generating status information to indicate that the hot runner system should be deactivated; detecting by a temperature sensor and a timer that one or more heating element zones of the one or more manifolds or nozzle or inlet nozzle are below a certain temperature level after a certain time limit, and generating status information to indicate that the hot runner system should be deactivated;
(f) detecting by a temperature sensor and a timer that a heating time exceeds a predefined limit in on one or multiple zones and no operating cycle is detected, and generating status information to deactivate the hot runner system or to deactivate the heating elements or temporarily deactivate the heating elements to reduce the temperature or activate a predefined lower temperature;
(g) detecting by a temperature sensor and a timer a shut off of the injection molding system if the temperature drops in a certain time below a predefined limit, and generating status information that the one or more actuators should be activated to close the one or more actuators before the melt solidifies;
(h) detecting by a temperature sensor and a timer that a temperature drops below a certain temperature is faster than a predefined threshold, indicating that a plastic material solidifies, and generating status information that the one or more actuators should be deactivated;
(i) detecting by a temperature sensor that a processing temperature is reached and a heat up safety time is exceeded without running production cycles in case no cycles are detected, and generating status information to indicate that the hot runner system or the one or more heating elements should be deactivated or that the temperature of the one or more heating elements should be reduced;
(j) detecting by a humidity sensor that a humidity is above a predefined level indicating that there is a cooling leakage generating status information to indicate that the hot runner system or the one or more heating elements should be deactivated;
(k) detecting by a flow sensor or a pressure sensor a leakage of cooling water and/or of fluid to drive the one or more actuators, and generating status information to indicate that the hot runner system should be deactivated;
(l) detecting by mechanical, electrical switches, temperature sensors or pressure sensors in areas with possible melt leakages of the hot runner system, and generating status information to indicate that the hot runner system should be deactivated if a leak occurs;
(m) detecting by a temperature sensor peeks within the flow channel of the hot runner system to determine the cycle time and/or the cycle number;
(n) detecting by the movement sensor or the deformation sensor cycle time and/or cycle number; and
(o) detecting by a pressure sensor in a flow channel that the pressure is above a predefined value which is too high for the hot runner system, a valve pin driven by a hydraulic, electric or pneumatic actuator will close the inlet nozzle to avoid damage;
wherein the processing unit is configured to detect a preheating in a preheat station of the hot runner system and configured to select one or more operations (a) to (o) with values different from the molding operation.

* * * * *